Dec. 28, 1965   L. L. NAGEL   3,226,615
CAPACITIVE PROBE AND SYSTEM FOR REGULATING GASES
Filed June 19, 1962   2 Sheets-Sheet 1
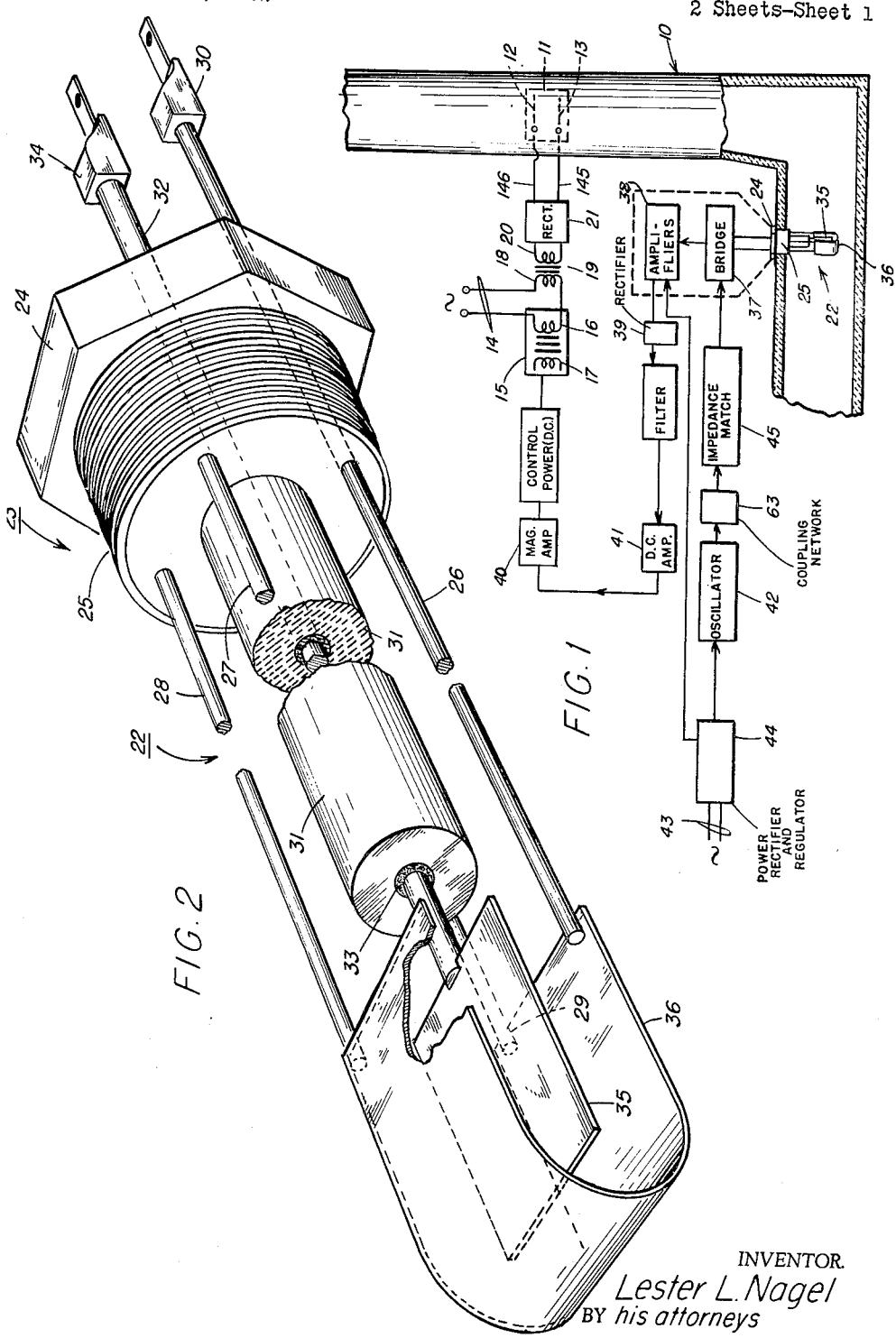
INVENTOR.
Lester L. Nagel
BY his attorneys
Howson and Howson INVENTOR.
Lester L. Nagel
BY his attorneys
Howson and Howson United States Patent Office 3,226,615
Patented Dec. 28, 1965

3,226,615
CAPACITIVE PROBE AND SYSTEM FOR REGULATING GASES
Lester L. Nagel, Summit, N.J., assignor to Buell Engineering Company, Inc., New York, N.Y., a corporation of New York
Filed June 19, 1962, Ser. No. 203,498
4 Claims. (Cl. 317—246)

This invention relates to voltage controlled systems for applying direct current voltage to a load circuit.

The invention finds its primary utility in connection with electric precipitators of the kind which employ a relatively high direct current voltage developed across a pair of spaced electrodes between which a gas, vapor or other flowing medium passes to precipitate dust or other similar particles therefrom.

Essentially such precipitators are based upon electrostatic principles, in that the particles to be precipitated are electrostatically attracted to one of the electrodes from which they can be dislodged in any suitable manner when sufficient accumulation thereon has occurred. In order to operate such a device at optimum efficiency, it is necessary to employ some kind of control over the voltage which is applied to the precipitator electrodes. Various methods of controlling such a voltage have been proposed heretofore. For example, in one known system reliance is placed upon the occurrence of sparks in the gas or smoke to be produced by the precipitator electrode voltages, the number or frequency of these sparks per unit time determining the voltage applied to the precipitator electrodes. Reliance upon spark production is inadvisable for a number of reasons, amongst which may be mentioned the difficulty of setting the controls in accordance with a predetermined number of sparks per unit time, the loss of precipitator power when the sparks are produced, and the random variation effect of the sparking with temperature, humidity, gas turbulence, resistivity of particles, particle size, grain loading (particles per unit of volume) and the like.

Accordingly, the present invention has for one of its objects the provision of a precipitator and voltage control system wherein a special sensing device is employed distinct from the precipitator electrodes. This sensing is achieved by a sensing probe of the same general characteristics as the precipitator. In other words, it is essentially a pure electrostatic device. I have found that improved results are obtained by using a sensing device in the form of a capacitor probe which is physically distinct from the elements of the precipitator itself. This enables the probe and certain associated equipment to be mounted as a unit at the most convenient and most desirable part of the duct or line through which the gas, vapor or smoke to be treated by the precipitator is flowing.

Another principal object of the invention is to provide an electric precipitator and voltage control system which embodies a novel capacitance detection arrangement, whereby variation of the dust content in a flowing gas, vapor or other flowing medium is converted into a direct current control signal through the intermediary of a high frequency transducing system.

A further object is to provide a simplified and more efficient converting system for converting the variations in the capacitance of a probe into direct current control signals using a transistor frequency conversion arrangement between the usual alternating current low frequency power supply mains and the capacity probe.

A feature of the invention relates to a voltage control system employing a capacity probe whose capacity variations are detected by an alternating current bridge of the conjugate kind, which bridge is supplied with alternating current of relatively high frequency derived from low frequency alternating current mains, and by using a temperature stabilized oscillator and impedance matching system between the mains and the bridge.

Another feature relates to an electric precipitation system, employing a saturable magnetic core or magnetic amplifier for controlling the power supplied to the precipitator electrodes, which power is in turn controlled by a direct current signal controlled by a capacity probe and a completely transistorized high frequency power supply and capacity variation detector.

A further feature relates to the novel organization, arrangement and relative location and interconnection of parts which, by their conjoint operation, provide an improved electric precipitator system and voltage control arrangement. Other features and advantages not particularly enumerated will be apparent after a consideration of the following detailed descriptions and the appended claims taken in conjunction with the attached drawings.

While the invention will be described with respect to its primary field of utility, namely in an electric precipitator system, it will be observed that in certain of its aspects it is equally well utilizable in any system where a load voltage is to be varied within predetermined limits to conform with the physical conditions to which the load device per se is subjected.

Accordingly, in the drawing,

FIG. 1 is a schematic block diagram of an electric precipitator system embodying the invention.

FIG. 2 is a detailed perspective view of the novel capacity probe used in the system of FIG. 1.

Figure 3:
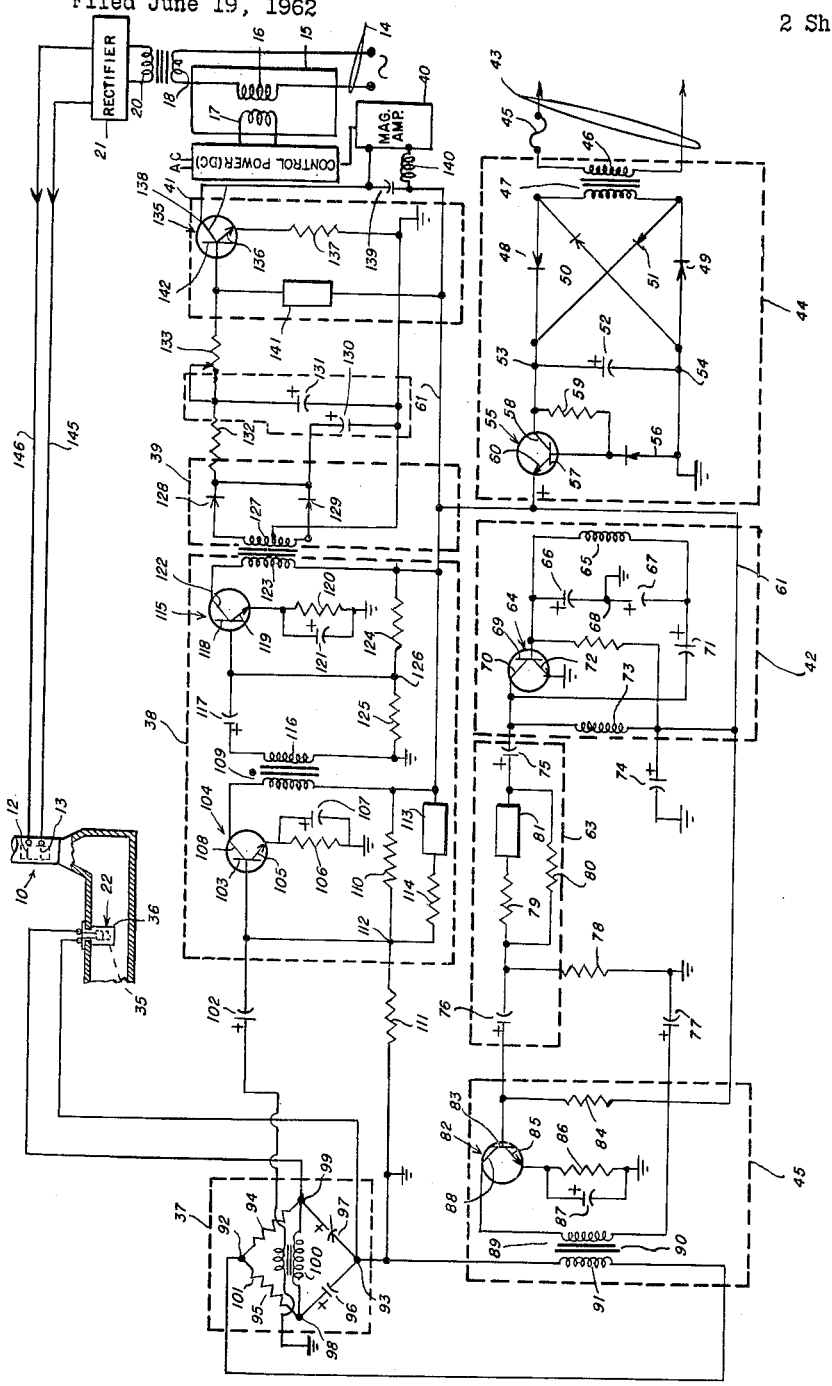
FIG. 3 is a detailed schematic wiring diagram of the electrical circuits and controls of FIG. 1.

In the case of electric precipitators which employ a pair of spaced electrodes energized by a relatively high direct current voltage, it becomes important from the viewpoint of efficiency and accuracy to conform the energizing potential to the dust content of the gas flowing through the precipitator. For example, in the case of a precipitator for a large power generating system, the station load varies quite widely during different times of the day. This load may vary as much as 50 percent between noon and midnight. This condition is reflected in the amount of dust or solid combustion products existing in the smoke passing through the precipitator. Therefore, it is necessary to provide means which automatically adjusts a direct current potential on the precipitator electrodes in accordance with the dust content of the smoke or gas.

Referring to FIG. 1, the numeral 10 represents any conventional line or duct, wherein is located at any suitable point any well known form of electric precipitator 11 with its spaced electrodes 12, 13. These electrodes are energized by a relatively high direct current voltage. This voltage is derived from the alternating current supply line 14 which feeds a saturable core reactor 15 or magnetic amplifier of any well known construction. Such reactor usually comprises an output winding 16 whose impedance in the supply line is controlled by the direct current voltage applied to an associated winding 17. Thus, the signal applied to winding 17 controls the voltage at the primary winding 18 of a step-up voltage transformer 19 whose secondary winding 20 feeds a rectifier 21 connected to the electrodes 12, 13. It will be understood, of course, that the invention is not limited to this particular manner of translating the direct current voltages applied to winding 17 into corresponding direct current high voltages at the electrodes 12, 13.

In accordance with the invention, the signal which feeds the reactor 15 is derived in the first instance from a capacitance probe 22 of novel construction which is specially designed to be mounted at any convenient point so that it protrudes into the duct or gas conveyance line 10 of the system.

As shown more clearly in FIG. 2, the probe comprises a supporting base or header in the form of a bushing 23 having a hexagonal flange 24 and an externally threaded shank 25 for threading into a corresponding threaded opening in the wall of the line 10. Passing through an axial bore in the bushing are four equally spaced metal support rods 26–29 which may be brazed at their lower ends to the outer flat face of flange 24. Three of these rods terminate at the said face, while the fourth rod 26 protrudes from the bushing and carries a terminal lug 30. Threaded centrally into the bushing is a refractory insulating sleeve 31, for example of steatite. Passing through a bore in sleeve 31 is a metal lead-in and plate support rod 32, which is coaxial with the bore in the bushing and which is tightly fitted into a tubular sleeve 33 of asbestos or similar compressible heat insulating material to allow the rod 32 to expand when heated. Rod 32 has a suitable terminal lug 34 attached to its protruding outer end. The opposite end of rod 32 is slotted to receive a flat metal plate 35 which is welded or brazed into the said slot. Also welded or brazed to the rods 26–29 is a U-shaped metal plate 36. Plates 35 and 36 constitute the plates of an electrostatic condenser or capacitor, and the size and spacing of said plates are chosen to provide a predetermined normally inherent capacitance therebetween.

Preferably, although not necessarily, probe 22 is mounted in the duct or gas line so that the plate 35 extends substantially parallel to the gas flow. In other words, the gas flows through the volume of space defined within the U-shaped electrode 36. In accordance with well known principles, the capacitance of condenser 35, 36 is determined not only by the physical size and spacing of the plates 35, 36, but also by the dielectric constant of the medium therebetween. Thus, when the probe is mounted in the line 10, the dielectric constant of the probe capacitor is a function of the dust or other particle content in the smoke, gas or vapor passing through the probe.

I have found that this variation of the dielectric constant provides an accurate, safe and efficient way of determining the dust or particle content in the smoke, vapor or gas. However, since the variations in capacitance of the probe are relatively small, it is necessary, in order to utilize such variations, to convert them into a relatively high frequency current for example of the order of 20 kc. per second. In other words, the probe is used as part of a relatively high frequency detection system operating at 20 kc. per second. For that purpose the probe is connected to a balancing bridge conjugate network 37 of the resistance-capacitance kind. That network will be described in more detail hereinbelow in connection with FIG. 3. Suffice it to say for the present that it produces at its output terminals a 20 kc. signal whose amplitude is a function of the amount of dust or solid particles existing in the smoke or gas under examination. This high frequency output is then amplified in a multi-stage transistor amplifier 38 whose amplified output is rectified in a suitable rectifier 39 and the rectified signal is passed through a suitable filter network to filter out any undesirable pulsations or variations. This produces the requisite direct current signal for application, after amplification in a direct current amplifier 41, to the magnetic amplifier 40 controlling the winding 17 mentioned hereinabove. The elements 37 and 38 may be mounted physically so as to constitute a unitary assembly with the probe 22, as indicated schematically in FIG. 1 by the dot-dash line enclosure. The remaining parts of FIG. 1, with the exception of the precipitator itself, can be mounted on a suitable control panel or console board at a convenient point.

In order to balance the bridge 37 for a given datum of dust content from the smoke or gas, the bridge is supplied with the 20 kc. voltage from a temperature stabilized transistor oscillator 42, which is fed with highly regulated direct current voltage derived in the first instance from the 60 cycle commercial supply line 43 after passing through a rectifier-transistor combination 44.

I have found that in order to achieve the desired stability of response between the probe capacity variations and the direct current control signal applied to the magnetic amplifier 40 controlling winding 17, it is advisable, if not necessary, to employ some kind of impedance matching network 45 between the transistor oscillator, which is essentially a low impedance device, and the balancing bridge 37, which is essentially a high impedance network. This impedance matching is, according to the invention, achieved through a special temperature compensating coupling network 63, transistor and impedance matching transformer combination 45. The net result is that the variations in capacitance at the probe 22 are faithfully translated into corresponding direct current voltages applied to winding 17 which, in turn, controls the direct current voltage applied to the precipitator electrodes 12, 13.

Thus, as the dust content and characteristics of the smoke or gas changes, it is necessary, in order to maintain the efficiency of the precipitator, to increase or decrease the direct current voltage on those electrodes. The arrangement disclosed accomplishes this result in a simple and accurate manner since the sensing device, namely probe 22, is electrostatic in operation as is the precipitator 11.

Referring to FIG. 3, a description will be given of the detailed electric circuits represented in block diagram form in FIG. 1, it being understood that wherever possible like parts in all three figures bear the same designation numerals. Thus, the line 43 represents any commerical 115 volt alternating current supply line which includes a suitable fuse 45 feeding the primary winding 46 of a voltage step-down transformer whose secondary 47 feeds a full wave rectifier comprising rectifier diodes 48–51 poled for conductivity as shown. Ripples or variations in the rectified output are filtered to ground through the filter condenser 52, thus developing across points 53, 54 a direct current potential of for example 13 volts with the polarity as indicated.

In order to provide the requisite high order of regulation in this direct current voltage, a regulating circuit comprised of transistor 55 and Zener diode 56 are provided, the Zener diode being connected between the base electrode 57 of the transistor and ground. While the drawing shows the transistor 55 and the remaining transistors as of the N-P-N kind, it will be understood that transistors of the P-N-P kind can be used with corresponding well known modifications of the connections. This transistor 55 may be of the type 2N339. The collector 58 is connected to ground through a resistor 59 and through Zener diode 56. By this arrangement, there is developed at the emitter 60 a highly regulated direct current voltage of, for example 12.6 volts. This voltage, applied over conductor 61, is the direct current supply for the transistor oscillator 42, the coupling network 63, and impedance matcher 45; and also over conductor 61 for the transistor amplifiers 38, rectifier 39 and the direct current transistor amplifier 41.

In order to develop the high frequency signal, for example of 20 kc. per second, for application to the capacitor bridge detection circuit 37, there is provided a transistor oscillator 42 using a transistor 64, which may for example be of a type 2N480. The frequency determining tank circuit for the oscillator is formed of the high frequency inductance 65 and condensers 66, 67, the junction point 68 being grounded. This tank circuit is connected between the base electrode 69 and collector electrode 70 through feed back condenser 71, the emitter 2 being grounded. The 12.6 direct current potential is applied to collector 70 through a high frequency choke coil 73. The direct current voltage is filtered against pulsations and variations by connecting conductor 61 to ground through filter condenser 74. The 20 kc. signal is transmitted through condenser 75 to a special temperature compensating coupling network 63, comprised of capacitors 76, 77, resistors 78, 79, 80 and thermistor 81. The thermistor maintains a substantially uniform coupling ratio between the oscillator 42 and the impedance matching network 45 over a range of temperature variations. Such an impedance matching network is necessary since the bridge detector 37 is of high impedance compared with the impedance of oscillator 42.

For the purpose of impedance matching, there is provided transistor 82 whose base electrode 83 is connected to the 12.6 volt line 61 through the current limiting resistor 84 and whose emitter electrode 85 is biased to ground through the parallel resistor 86 and capacitor 87. The collector 88 is returned to ground through capacitor 77 and the primary winding 89 of a voltage step-up transformer 90 whose secondary winding 91 is connected across the diagonal points 92, 93 of the alternating current bridge 37. Thus, there is developed across the diagonal points 92, 93 a voltage of approximately 220 volts A.C. (R.M.S.) at 20 kc. This bridge comprises four ratio arms consisting of resistors 94, 95 and capacitance arms comprised of the fixed capacitor 96 and the manually adjustable capacitor 97.

Bridged in the usual way across the conjugate points 98, 99 of the network 37 is the primary winding 100 of a bridge output transformer whose secondary winding 101 has one end grounded and the other end connected through coupling condenser 102 and thence to the base electrode 103 of a first stage transistor amplifier 104. The emitter electrode 105 of the transistor is biased with respect to ground through resistor 106 and parallel condenser 107. The collector electrode 108 is connected through the primary winding of a transistor coupling transformer 109 to ground through the voltage divider resistors 110, 111, the common connection point 112 of which is connected to the base electrode 103. Bridged across the resistor 110 is a temperature compensating circuit comprised of a thermistor 113 and series resistor 114. This stabilizes the first stage of the transistor amplifier against temperature variations in the transistor or associated circuits of the first stage. The transistor 104 may be of the type 2N336A.

A second stage amplifier transistor 115 is coupled to the collector output of stage 104 through the secondary winding 116 of the transistor coupling transformer and thence through coupling condenser 117 to the base electrode 118 of transistor 115. Here again the emitter 119 is biased with respect to ground through the resistor 120 and parallel capacitor 121. The collector electrode 122 is returned to ground through the primary winding 123 of a coupling transformer, and thence to ground through the voltage divider resistors 124, 125, the common junction 126 of which is connected to the base electrode 118. The transistor 115 may be of a type 2N334A transistor. The amplified 20 kc. signal from transistor 115 is connected through the secondary winding 127 to a full wave rectifier comprising the rectifier diodes 128, 129. This rectified voltage is filtered against ripples and variations by the filter condensers 130, 131 and resistor 132. The rectified voltage is then applied through a potentiometer resistor 133 to the base electrode 142 of the direct current transistor 135. The emitter 136 is returned to ground through the current limiting resistor 137. The collector electrode 138 is connected to the direct current control winding of the magnetic amplifier 40 and also to the filter network, comprising capacitor 139 and choke coil 140, the other side of the capacitor being connected to the choke coil whose opposite end is connected to the magnetic amplifier. The junction of the capacitor 139 and choke coil 140 is connected to the direct current line 61 and thereby to the thermistor 141 and thence to the base electrode 142. The alternating current supply line 14 feeds the saturable core reactor 15 which has a winding 16 that is in series with the alternating current supply.

In accordance with the well known principle of magnetic amplifiers, variation in the direct current output signal of the magnetic amplifier varies the D.C. control power to the winding 17 of the saturable core reactor 15, causing the voltage from the line 14 to be varied by a change in the impedance of the A.C. winding 16 coupled through the primary 18 of the HV transformer 19. This in turn controls the secondary 20 connected to the rectifier 21 whose direct current output is connected over conductors 145 and 146 to the electrodes 12 and 13 of the precipitator in the gas line 10.

Thus, changes in capacitance at the probe 22 are controlled by conditions of the dust plus any other conditions of the gas or vapor in the line 10 into faithfully amplified direct current voltages of the requisite high voltage for application to the precipitator electrodes. It will be understood, of course, that the voltage control system above described is shown wherein the load consists of an electric precipitator, but it will be clear that the control system is equally well applicable to any other kind of load which requires control of a relatively high voltage whose magnitude can be accurately varied in accordance with a selected physical condition of the medium in which the probe 22 is located.

By means of the manually adjustable capacitor 97, the system can be initially adjusted so that at any given condition of the dust content and other physical condition of the gas, vapor, or other medium in which the probe 22 is located, the control system signal can be set to cause the correct corresponding direct current voltage at lines 145, 146. Thus, in the case of an electric precipitator, the capacitor 97 may be set at a point representing the correct dielectric constant for the gas flowing through the line 10 which produces, for example, a direct current voltage of 50 kilovolts across the lines 145, 146. As the gas characteristics change, it is necessary to vary that voltage, and this is automatically accomplished since the capacitance of the probe 22 correspondingly changes, thus unbalancing the bridge 37 from its previous setting and resulting in a change of level of the 20 kc. signal at the input of amplifier 38 and consequently a corresponding change in the direct current potential on the lines 145, 146.

By thus using a capacitance probe coupled to a capacity-resistance bridge, it is possible to track the variations in gas characteristics more accurately in terms of voltage across the precipitator electrodes, thus increasing the accuracy, sensitivity and efficiency of the precipitating system.

Various changes and modifications may be made in the disclosed system without departing from the scope and objects of the invention.

What is claimed is:

1. A sensing device for use with an electrostatic precipitator control system, comprising a capacitance probe which is adapted to be inserted into a gas-conducting duct to sense changes in the properties and condition of the gas by variations in capacitance of the probe, said probe comprising a conductive supporting member formed for mounting in a duct wall; an insulating member extending through said supporting member; a small conductive rod extending through said insulating member and electrically insulated thereby from said supporting member; capacitance means including first and second electric condenser plates insulated and spaced from one another one of which is mounted on said rod and has a surface area substantially greater than said rod; and means having no substantial capacitance relationship to said one plate and supporting said second condenser plate in electrically conducting relation with said first mentioned supporting member.

2. A sensing device for use with an electrostatic precipitator control system, comprising a capacitance probe which is adapted to be inserted into a gas-conducting duct to sense changes in the properties and condition of the gas by variations in capacitance of the probe, said probe comprising a conductive supporting member formed for mounting in a duct wall; an insulating member extending through said supporting member; a conductive member extending through said insulating member and electrically insulated thereby from said supporting member; capacitance means including first and second electric condenser plates insulated and spaced from one another one of which is mounted on said insulated member; the second plate being bent into U-shape with parallel portions spaced from opposite sides of said first plate and parallel thereto, and means supporting said second condenser plate rigidly on both sides from said first supporting member and in electrically conducting relation therefrom.

3. A sensing device for use with an electrostatic precipitator control system, comprising a capacitance probe which is adapted to be inserted into a gas-conducting duct to sense changes in the properties and condition of the gas by variations in capacitance of the probe, said probe comprising a conductive supporting member in the form of a threaded metal bushing whereby the probe can be threaded into the wall of the duct, an insulator tube centrally fastened to said bushing and having a longitudinal bore in alignment with a corresponding bore in said bushing, a pair of condenser plates, a plate support and lead-in rod passing through said bores and attached to one of said plates, a plurality of other support rods for the other of said plates and anchored in said bushing, at least one of said other rods extending externally to said bushing to provide a lead in connection to said other plate.

4. A sensing device as claimed in claim 3 having an expansible heat resistant tubular lining between the first mentioned rod and the bore in said insulator.

References Cited by the Examiner
UNITED STATES PATENTS

| | | | |
|---|---|---|---|
| 1,120,560 | 12/1914 | Strong | 55—105 |
| 1,253,584 | 1/1918 | Gerken | 313—139 |
| 1,325,439 | 12/1919 | Dinger | 313—139 |
| 1,359,767 | 11/1920 | Thomas | 313—142 |
| 2,623,608 | 12/1952 | Hall | 55—105 |
| 2,783,420 | 2/1957 | Thompson et al. | 317—246 |
| 2,885,628 | 5/1959 | Pell et al. | 323—66 |
| 2,892,146 | 6/1959 | Malsbary | 323—66 |
| 2,896,138 | 7/1959 | Grinstead | 317—246 |

FOREIGN PATENTS 377,343    6/1923    Germany.

JOHN F. BURNS, *Primary Examiner.*

ROBERT F. BURNETT, *Examiner.*